Nov. 7, 1933.   B. L. MALLORY   1,933,863
SHOCK ABSORBER
Filed May 26, 1930   2 Sheets-Sheet 1
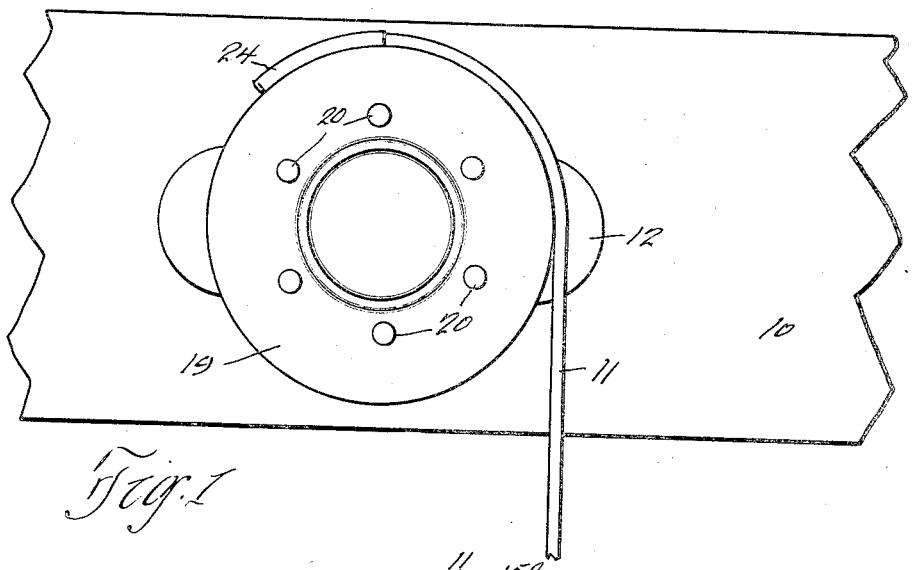
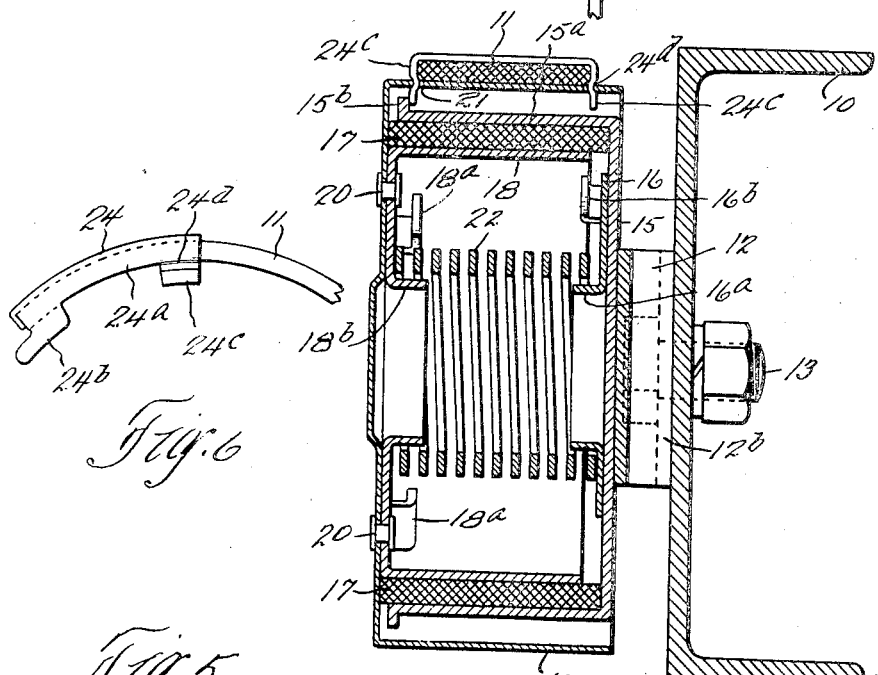
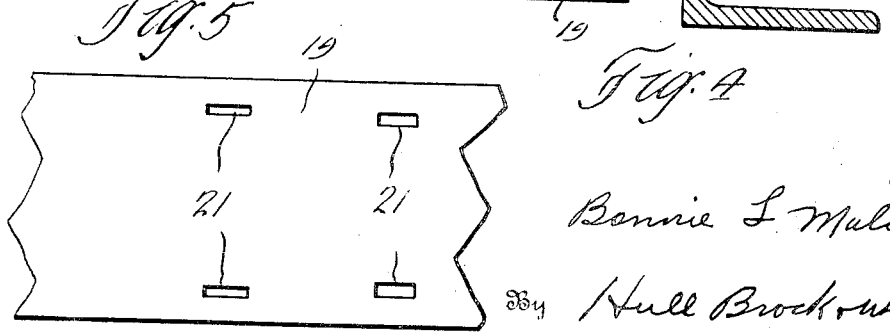
Inventor
Bonnie L. Mallory
By Hull Brock......
Attorney Nov. 7, 1933.   B. L. MALLORY   1,933,863
SHOCK ABSORBER
Filed May 26, 1930   2 Sheets-Sheet 2

Inventor
Bonnie L Mallory
By Hull Brock & West
Attorney

Patented Nov. 7, 1933

1,933,863

UNITED STATES PATENT OFFICE 1,933,863

SHOCK ABSORBER

Bonnie L. Mallory, Cleveland Heights, Ohio, assignor to The Cleveland Shock Absorber Company, Cleveland, Ohio, a corporation of Ohio Application May 26, 1930. Serial No. 455,484

5 Claims. (Cl. 267—10)

This invention relates to a shock absorber of the type adapted to be interposed between the frame member of a vehicle and the axle thereof to prevent excessive rebounds and improve the "riding characteristics" of the vehicle.

An object of the invention is to provide such a shock absorber which shall be cheap to manufacture, conveniently assembled and serviced, simple in construction and efficient in its shock absorbing function. With these and other objects in view, the invention resides in the details of construction and arrangement of parts hereinafter described and claimed.

Figure 2:
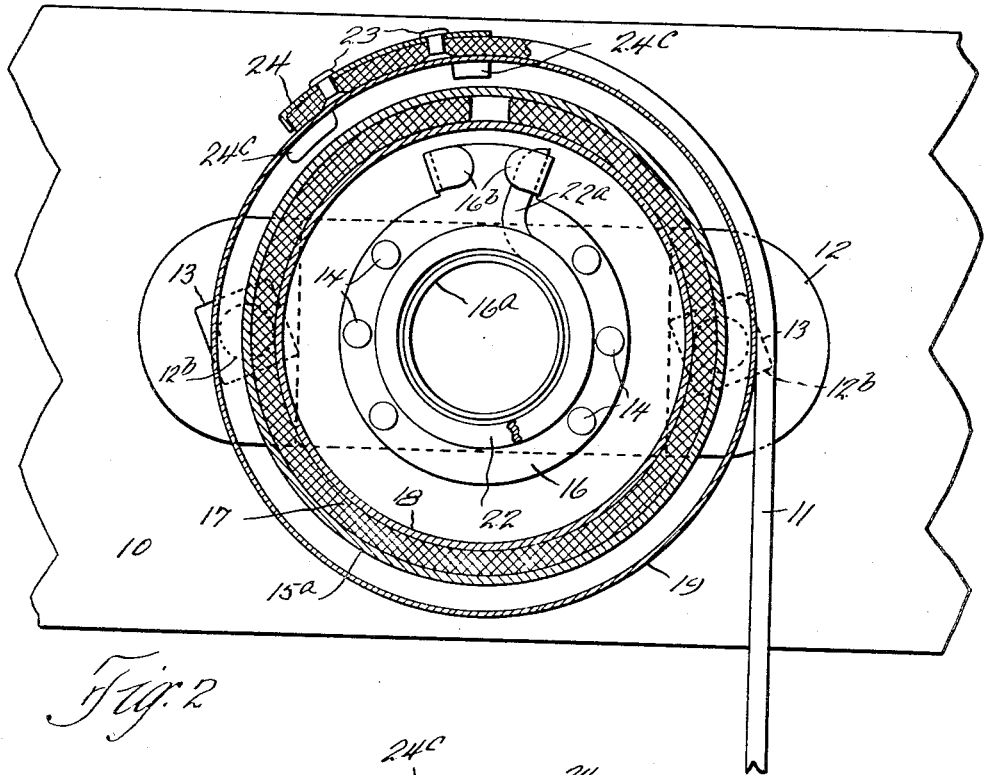
Figure 3:
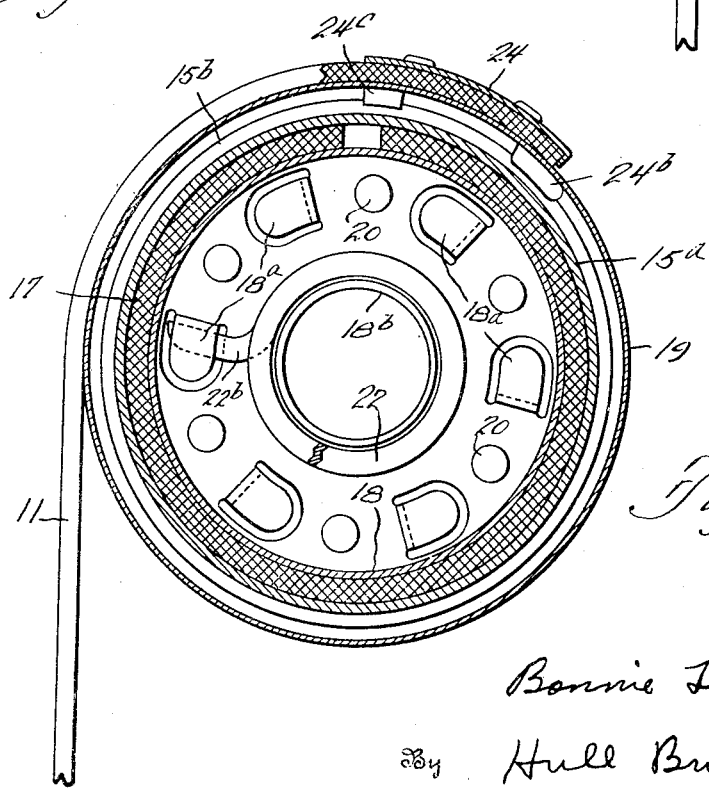

Fig. 1 is a fragmentary elevation of my improved shock absorber; Fig. 2 is a fragmentary sectional view looking in the direction of the axis and toward the vehicle frame member; Fig. 3 is a section similar to that of Fig. 2 but looking in the opposite direction; Fig. 4 is a vertical section taken on a plane containing the axis; Fig. 5 is a fragmentary plan showing the buckle and strap removed; and Fig. 6 is a fragmentary elevation of the buckle and strap showing the same removed.

Referring to the drawings, numeral 10 indicates the frame member of a vehicle. While this device is described with reference to its use on an automobile, it is evident that it may be used in any connection where it is desired to limit the separation of two parts which are movable with respect to each other. The axle member of the vehicle is not shown, but it is to be understood that the strap 11 will be connected thereto in any convenient manner well known to those skilled in the art.

The mechanism which I employ for connecting the shock absorber to the frame 10 consists of a bent plate 12 which is provided with two end portions adapted to contact with the frame member 10 and an upwardly bent central portion which is adapted for attachment to a shock absorber drum unit. The member 12 is provided with openings $12^b$ adapted to receive bolts 13. These holes are so positioned with respect to the portion of the strap 12 which connects the end portions with the upraised central portion $12^a$ that the bolt heads cannot rotate with respect to the member 12 when the heads thereof are in contact with the end of the plate 12. A series of openings are provided in the central upraised portion $12^a$ to receive rivets 14 which extend through corresponding openings in a portion of a fixed drum assembly, hereinafter described, for attaching the same to the frame member.

Fixed drum assembly

The fixed drum assembly comprises a drum, hereinafter referred to as the fixed or exterior drum, together with a spring positioning disk 16 which is connected to said drum member by the rivets 14 which extend through such spring positioning disk, through the drum 15 and through the central portion $12^a$ of the plate 12. The drum 15 comprises a flat circular end wall and a right circular cylindrical flange $15^a$, the inner surface of which acts as one of the braking members and is provided with a radially outwardly extending rim $15^b$ at the edge thereof remote from the circular end wall, and which cooperates with a buckle member in the manner hereinafter described. The spring positioning disk 16 includes a centrally positioned flange or projection $16^a$ extending in the same direction as the flange $15^a$, and a double hook portion $16^b$. The hook portion $16^b$ is provided for the purpose of securing a spring, and the double hook is provided in order that the same fixed drum assembly may be employd for both right and left shock absorber units.

Loosely positioned within the fixed drum assembly and contacting the inner surface of the flange $15^a$ is a friction brake band or lining 17. This lining has a width slightly greater than that of the flange $15^a$ which prevents the movable drum assembly from engaging and chattering against the fixed drum assembly, as will hereinafter appear. The thickness of the brake lining 17 is slightly less than the radial distance between the inner and outer drum member when they are concentric with each other. The drum members are loosely connected together and may be described as relatively floating. The brake band likewise is not secured to either of the drum members and may be considered as a floating band.

Movable drum assembly

The movable drum assembly comprises an interior drum 18 and an exterior housing 19. The inner drum 18 comprises a circular end wall having struck-out hooks $18^a$ thereon extending in the same direction around the outer portion thereof, as best seen in Fig. 3, to receive an end of a central spring, and provide for adjustment of the tension depending upon which hook is engaged with the spring. This wall is also provided with a plurality of openings through which rivets 20 are adapted to extend for securement thereof to the exterior housing 19. The end wall of the inner drum is also provided with a spring positioning flange or projection $18^b$ corresponding to that 16ª of the fixed drum assembly. In addition to the end wall, the inner drum includes a right cylindrical drum flange, the outer surface of which is adapted to engage the friction brake lining 17 to create shock absorbing or snubbing action. The exterior housing 19 is provided with openings in the end wall thereof to receive the rivets 20 and has a right cylindrical flange concentric with the flange of the inner drum 18. In the flange of the exterior housing member I provide four openings or slots 21, for the reception of lugs on the buckle, hereinafter described. The flange of the housing 19 is, as shown in the drawings, of such a width as to extend substantially flush with the surface of the end wall of the exterior drum member 15.

A spring member 22 is inserted between the two housing assemblies and is provided with outwardly extending end portions 22ª and 22ᵇ which engage with the hooks 16ᵇ and 18ª respectively.

Buckle and strap

The strap 11 is connected at one end to the vehicle axle and at the other by means of rivets 23 to a buckle 24. The buckle 24, as best seen in Fig. 6, includes an arcuate top portion having downwardly extending flanges 24ª, a pair of forwardly extending hooking lugs 24ᵇ and a pair of latching lugs 24ᶜ. As will be apparent from Fig. 4, the latching lugs are provided with small grooves 24ᵈ which engage with the sides of the forward pair of slots 21 to retain the buckle in engagement with such slots. The total length of the hooking lugs 24ᵇ is greater than that of the rearward slots 21, and consequently they can be inserted therein and removed therefrom only when the latching lugs 24ᶜ are disengaged from their slots. As is clear from the drawings, the strap 11 will be attached by means of the buckle 24 at some point on the exterior housing such that separation of the vehicle members will tend to cause unwinding of such strap and consequent rotation of the movable drum assembly with respect to the fixed drum assembly. It will be evident that the downward pull on the strap 11 in addition to causing unwinding thereof and rotation of the movable drum assembly will have a large component downwardly causing the inner drum to press the friction lining against the outer drum. The action of the spring is to oppose this unwinding and tend to cause rotation in the other direction, and its force also will have a downward component. It is evident that the tension in the spring, secured by adjustment, by means of the hooks 18ª or by making such spring of suitable dimensions, may be so regulated that the force exerted by the drum members tending to compress the brake lining will be any amount desired.

From the foregoing, the various features of my invention will, it is thought, be sufficiently clear to enable any person skilled in the art to embody the same in a practical device, and while I have illustrated and described a preferred form of my invention, I do not wish to be limited to details thereof but wish it understood that I may carry my invention into effect in various forms within the scope of the appended claims.

Having thus described my invention, what I claim is:

1. In a shock absorber, an external drum having an end wall and a circular flange, an attaching bracket connected to the outside of said end wall, a spring positioning disk attached to the inner surface of said end wall, an internal floating drum including an end wall and a circular flange and adapted to be received within said external drum, means on the end wall of the internal drum to position and retain a spring, a brake lining between the flanges of said drums, a spring between the end walls of said housings and engaged with said spring positioning disk and said means and constraining rotation of said inner drum, mechanism for connecting said bracket to the frame of a vehicle, a protecting housing attached to the end wall of said internal drum and having a circular flange extending outside said external drum, and flexible means connected to and wound on said last mentioned flange and connected to the axle of said vehicle.

2. In a shock absorber, a pair of telescoping relatively floating drum members each having a cylindrical flange, a friction band carried loosely between said flanges, means for connecting one of said drums to the frame of a vehicle, and means for connecting the other drum to the axle of said vehicle in such a way that separation of said frame and axle causes relative rotation of said drums, said friction band being wider than either of said flanges and each drum including an end wall with which said flanges are integral, the flange of one of said drums having a rim extending radially outwardly from the edge thereof, the other drum having a cup-like cover substantially greater in diameter than said rim and within which said rim is received, an opening in said cover and a lug projecting therethrough behind said rim to prevent separation of said drum members.

3. In a shock absorber, a pair of relatively floating telescoping drum members each having a cylindrical flange, a friction band carried loosely between said flanges, means for connecting one of said drums to the frame of a vehicle, and means for connecting the other drum to the axle of said vehicle in such a way that separation of said frame and axle causes relative rotation of said drums, said friction band being wider than either of said flanges and each drum including an end wall with which said flanges are integral, the flange of one of said drums having a rim extending radially outwardly from the edge thereof, the other drum having a cup-like cover substantially greater in diameter than said rim and within which said rim is received, openings in said cover and a buckle cooperating therewith and having thereon a lug adapted to extend through one of said openings and engage behind said rim, and a latching lug adapted to extend through another of said openings and tensionally retain said buckle in place.

4. In a shock absorber, an external drum having an end wall and a circular flange, an internal drum including an end wall and a circular flange and adapted to be received within said external drum, spring means connecting the two drums and constraining relative rotation thereof, an external housing attached to the interior drum and including a circular flange concentric with the flange of said interior drum, a friction brake lining between said drums, means for connecting said exterior drum to a vehicle frame, openings in said exterior housing, a buckle having lugs received in said openings and a strap attached to said buckle, wound at least partially around said exterior housing and adapted to be connected to the axle of said vehicle, said exterior drum having an outwardly extending rim at the edge of its flange, and a lug on said buckle extending behind said rim to hold the parts in assembled relation.

5. In a shock absorber, an external drum having an end wall and a circular flange, an internal drum including an end wall and a circular flange and adapted to be received within said external drum, spring means connecting the two drums and constraining relative rotation thereof, an external housing attached to the interior drum and including a circular flange concentric with the flange of said interior drum, a friction brake lining between said drums, means for connecting said exterior drum to a vehicle frame, openings in said exterior housing, a buckle having lugs received in said openings and a strap attached to said buckle, wound at least partially around said exterior housing and adapted to be connected to the axle of said vehicle, each of the ends walls of said drums having thereon a spring positioning projection.

BONNIE L. MALLORY.